(12) United States Patent
Bolt

(10) Patent No.: US 7,423,396 B2
(45) Date of Patent: Sep. 9, 2008

(54) HALL SENSOR ALIGNMENT FOR BLDC MOTOR

(75) Inventor: Laird Bolt, Nova Scotia (CA)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/149,735

(22) Filed: Jun. 10, 2005

(65) Prior Publication Data

US 2005/0275361 A1    Dec. 15, 2005

Related U.S. Application Data

(60) Provisional application No. 60/579,037, filed on Jun. 11, 2004.

(51) Int. Cl.
    *H02K 29/08*    (2006.01)
(52) U.S. Cl. .............. 318/400.38; 318/400.34; 318/459; 318/500; 388/928.1
(58) Field of Classification Search ........... 318/254, 318/138, 439, 700, 701, 500, 459, 400.38, 318/400.34, 400.32; 388/928.1
    See application file for complete search history.

(56) References Cited

U.S. PATENT DOCUMENTS

| | | | |
|---|---|---|---|
| 3,170,323 A | 2/1965 | Kuhrt et al. | |
| 3,636,767 A | 1/1972 | Duffy | |
| 3,668,496 A | 6/1972 | Markowitz et al. | |
| 3,742,243 A | 6/1973 | Gamble | |
| 4,488,112 A | 12/1984 | Thompson et al. | |
| 4,635,353 A | 1/1987 | Tamagne | |
| 4,739,240 A * | 4/1988 | MacMinn et al. | ........... 318/696 |
| 4,829,248 A | 5/1989 | Loubier | |
| 4,897,914 A | 2/1990 | Loubier | |
| 5,014,005 A | 5/1991 | Murata et al. | |
| 5,093,617 A | 3/1992 | Murata | |
| 5,107,195 A * | 4/1992 | Lyons et al. | ................. 318/701 |
| 5,131,366 A | 7/1992 | Rawlings et al. | |
| 5,285,135 A * | 2/1994 | Carobolante et al. | ........ 318/254 |
| 5,384,527 A * | 1/1995 | Rozman et al. | ............... 322/10 |
| 5,955,860 A * | 9/1999 | Taga et al. | .................... 318/700 |
| 6,153,956 A * | 11/2000 | Branecky | ................... 310/68 B |
| 6,236,174 B1 | 5/2001 | White | |
| 6,252,362 B1 | 6/2001 | White et al. | |
| 6,291,949 B1 * | 9/2001 | Green | ......................... 318/254 |
| 6,389,373 B1 | 5/2002 | Ohya | |
| 6,512,343 B1 * | 1/2003 | Yasohara | ..................... 318/437 |
| 6,608,462 B2 * | 8/2003 | Slater et al. | .................. 318/701 |
| 6,640,417 B2 | 11/2003 | Leitz et al. | |

(Continued)

FOREIGN PATENT DOCUMENTS

CN    1489823    4/2004

(Continued)

*Primary Examiner*—Rina I Duda
(74) *Attorney, Agent, or Firm*—Ostrolenk, Faber, Gerb & Soffen, LLP

(57) ABSTRACT

A technique for determining an alignment error of a Hall sensor location in a brushless DC motor drive, by measuring the back EMF waveform, preferably while the motor is coasting. According to the technique, an angular offset is calculated between a selected BEMF waveform and a selected Hall signal. Such offsets are preferably calculated for each phase individually. The offsets may be advantageously stored in the motor control unit and used to adjust the output motor control signals for maximum torque.

24 Claims, 7 Drawing Sheets

U.S. PATENT DOCUMENTS

| | | | |
|---|---|---|---|
| 6,703,827 B1 | 3/2004 | Wolf et al. | |
| 6,850,022 B2 * | 2/2005 | Liu et al. | 318/439 |
| 6,957,590 B2 * | 10/2005 | Maeda et al. | 73/862.334 |
| 7,242,175 B2 | 7/2007 | Shao et al. | |
| 2003/0111975 A1 * | 6/2003 | Slater | 318/701 |
| 2003/0210006 A1 | 11/2003 | Kusaka | |
| 2004/0007998 A1 * | 1/2004 | Yasohara et al. | 318/437 |

FOREIGN PATENT DOCUMENTS

| | | |
|---|---|---|
| CN | 1684354 | 10/2005 |
| DE | 103 20 126 | 12/2003 |
| EP | 1350308 | 10/2003 |
| JP | 09047066 | 2/1997 |
| JP | 2001-136779 | 5/2001 |
| JP | 2002-165480 | 6/2002 |
| JP | 2002-262600 | 9/2002 |

\* cited by examiner

HALL SENSOR ALIGNMENT FOR BLDC MOTOR

CROSS REFERENCE TO RELATED APPLICATION

The present application is based upon and claims priority of U.S. Provisional Application Ser. No. 60/579,037 filed Jun. 11, 2004, incorporated by reference in its entirety.

BACKGROUND OF THE INVENTION

The present invention relates to a brushless DC motor drive, and more particularly to a method and system for determining an alignment error of a Hall sensor in such a drive, advantageously for optimizing the location of the Hall sensor.

Brushless DC motor drives commonly use Hall-effect sensors to determine rotor position. The Hall sensors sense the magnetic field of a magnet on the rotor, and produce a digital pattern indicating the rotor position in one of 6 possible sectors. Errors are introduced due to the relative mechanical locations of the Hall sensor and the magnet, the resolution and accuracy of the sensor, the pole width of the sense magnet, and the physical relationship between the sense magnet and the rotor. Because of these potential sources of error, the position measured by the Hall sensors may not exactly match the real rotor position. This position error can cause generation of lower torque at a given current.

SUMMARY OF THE INVENTION

To address and avoid these potential sources of error, a technique has been developed to determine an alignment error of a Hall sensor location in a brushless DC motor drive, by measuring the back EMF waveform preferably while the motor is coasting.

The technique is characterized in that an angular offset is calculated between a selected BEMF waveform and a selected Hall signal. Such offsets are preferably calculated for each phase individually. The offsets may be advantageously stored in the motor control unit and used to adjust the output motor control signals for maximum torque.

The disclosed techniques have been tested and found to give good results substantially independent of changes in speed.

Other features and advantages of the present invention will become apparent from the following description of embodiments of the invention which refers to the accompanying drawings.

DETAILED DESCRIPTION OF EMBODIMENTS OF THE INVENTION

A technique has been developed whereby an external unit which can control the BLDC motor under test, and which has electrical access to the motor phase voltages, can measure and indicate how to correct the Hall alignment.

Figure 1:
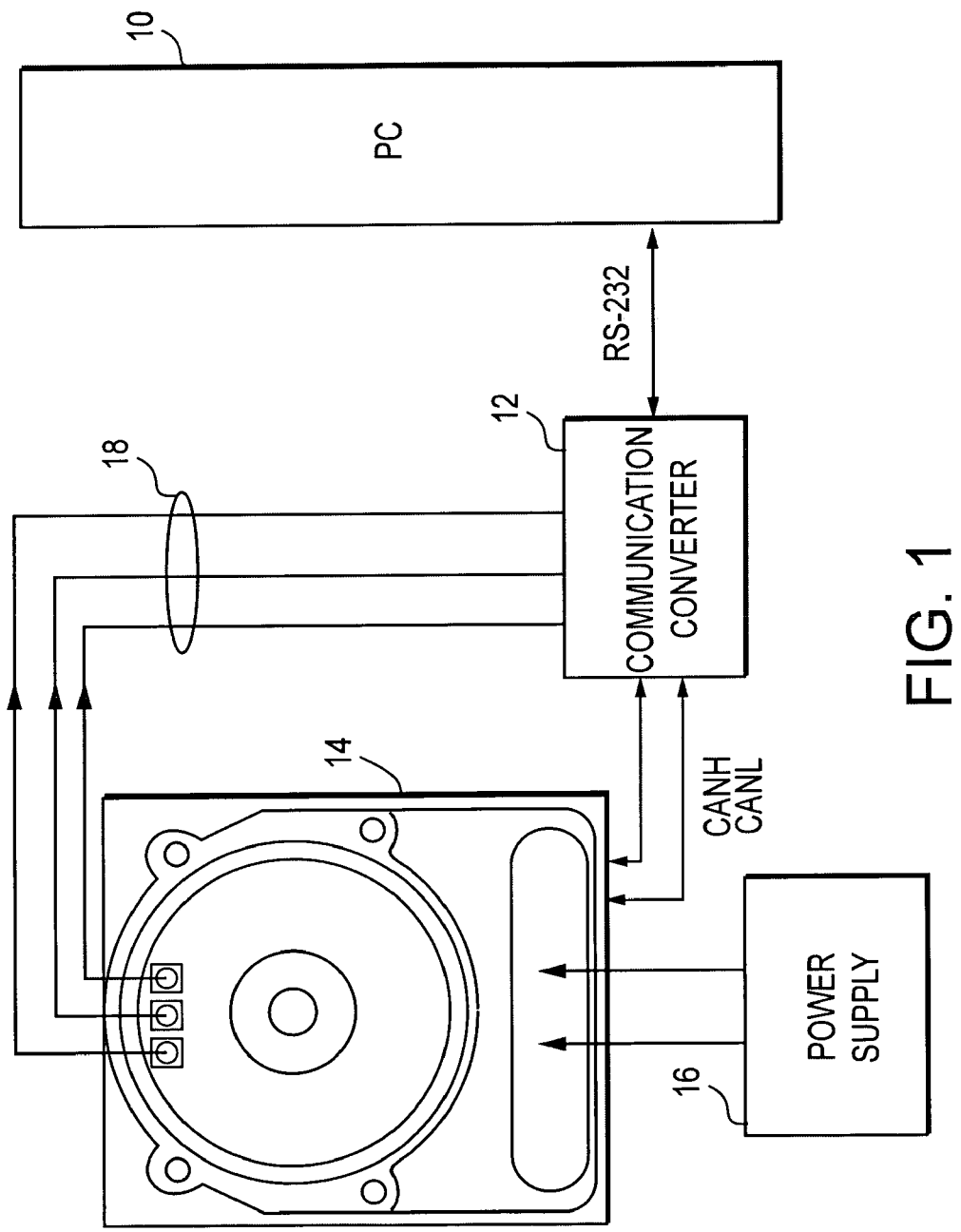
FIG. 1 is a schematic diagram of a circuit arrangement for practicing the invention.

An example of such an arrangement is shown in FIG. 1, comprising a PC 10, a communication converter 12, a motor with an electronic control unit (ECU) 14 and a power supply 16. In an example of a test procedure, the PC controls the communication converter to start Hall alignment. The communication converter controls the ECU to run the motor at a selected speed and to enter Hall alignment mode. Then the ECU stops the motor drive, allowing the motor to coast, and the communication converter begins sensing the Hall and BEMF signals over the lines 18 and the lines CANH/CANL. The communication converter calculates a phase advance if needed to correct a Hall alignment error and controls the ECU to store such phase advance in an EEPROM, for example, for use in correcting the rotor position signals for controlling the motor drive to produce maximum torque.

Figure 2:
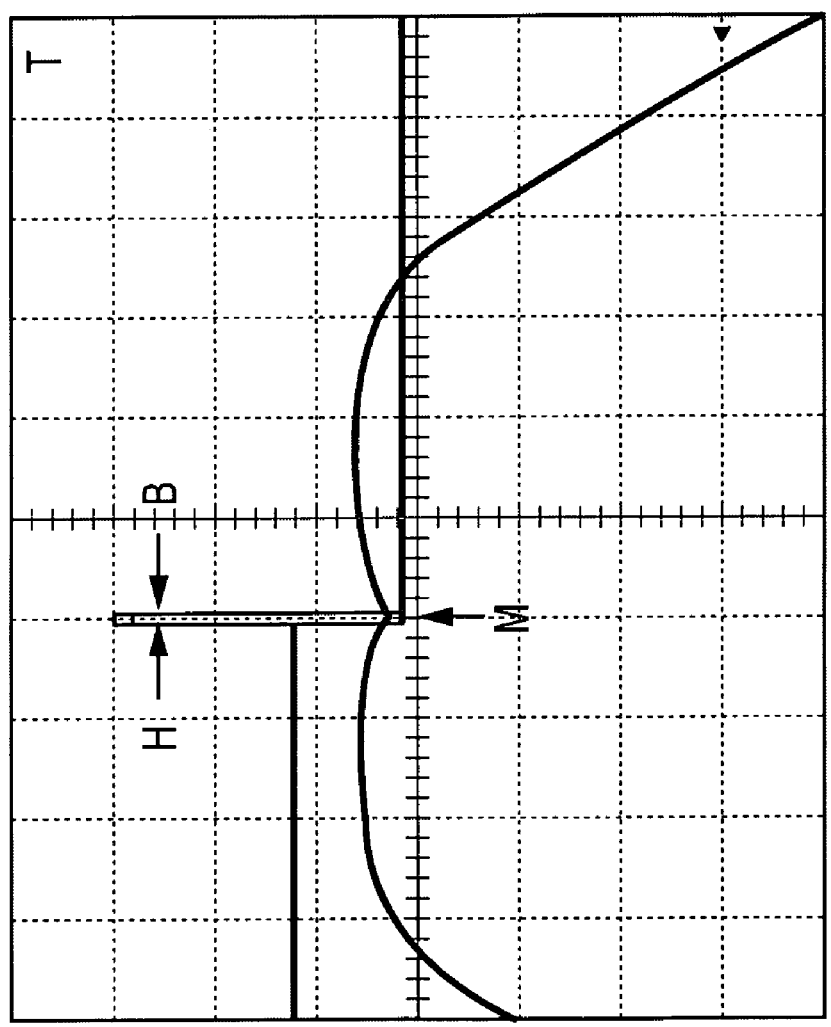
FIG. 2 is a graph illustrating generically a phase offset of the type to be measured.

See FIG. 2 for a generic illustration of the methodology. A Hall sensor misalignment is detected as a phase error D between an edge of a Hall signal (here a falling edge) H and a local minimum M of a back-EMF signal B. Once measured, the phase error D may be stored in the electronic motor control unit for use in compensating the motor control signals and increasing the generated torque.

Figure 3:
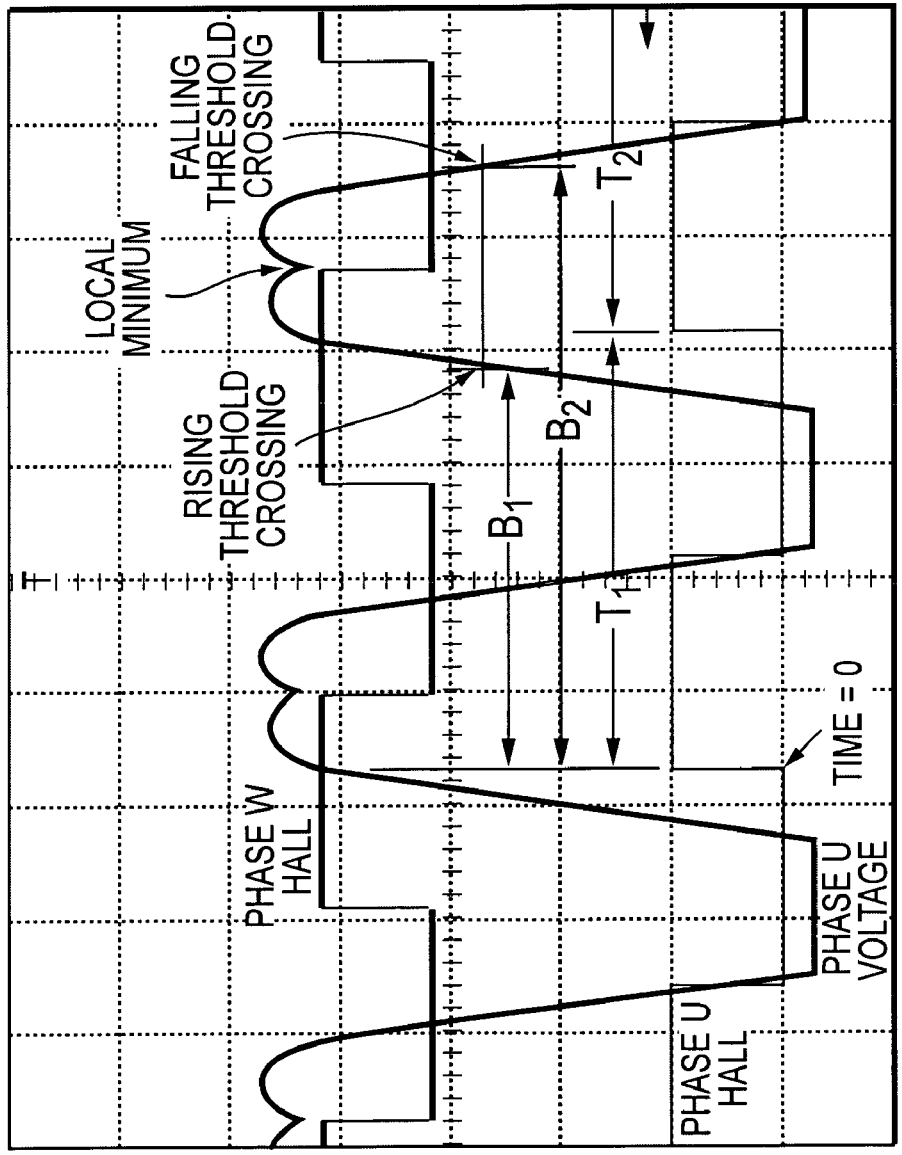
FIG. 3 is a graph illustrating an analysis of Phase U Hall signals and Phase U back EMF (BEMF) signals according to an embodiment of the invention.

In an example of the technique, the Phase U Hall signal will be aligned with the Phase U BEMF. All measured times are referenced back to the Hall signal. See FIG. 3.

Assuming the motor is rotating at a constant speed w(RPM) then the Hall signal will have a frequency f(Hz) given by:

$$f = 3 * w / 60 \quad (1)$$

In general, a periodic signal can be expressed as a Fourier series:

$$G(t) = a_0/2 + a_1 \cos(2\Pi f^* t) + b_1 \sin(2\Pi f^* t) + a_2 \cos(4\Pi f^* t) + b_2 \sin(4\Pi f^* t) + \quad (2)$$

Given that we have defined time=0 to be at the rising edge of the Hall signal, then the Fourier series of the Hall signal can be expressed as:

$$G(t) = a_0/2 + b_1 \sin(2\Pi f^* t) + b_2 \sin(4\Pi f^* t) + b_3 \sin(6\Pi f^* t) + \quad (3)$$

If we ignore or assume the DC component is 0 i.e. $a_0 = 0$, then:

$$G(t) = b_1 \sin(2\Pi f^* t) + b_2 \sin(4\Pi f^* t) + b_3 \sin(6\Pi f^* t) + \quad (4)$$

And, when $t = n/f$ (where $n = 0, 1, 2, 3 \ldots$) then: $G(t) = 0$ \quad (5)

Alternatively, by looking at the fundamental frequency only we can write:

$$G(t) = 0 \text{ when } \sin(2\Pi f^* t) = 0 \quad (6)$$

$$2\Pi f^* t = n * 2\Pi \quad (7)$$

$$f^* t - n = 0 \quad (8)$$

Equation (8) is the primary equation of interest. We cannot assume that f is constant i.e. $\Delta f = df/dt \neq 0$. However, we will assume that $d^2 f/dt^2 = 0$, i.e. acceleration is constant.

Frequency is actually a function of time, that is:

$$F(t) = f - \Delta f^* t \quad (9)$$

The motor will have a declining frequency when the motor is coasting and therefore, substituting F(t) for f into equation (4), we obtain:

$$G(t) = b_1 \sin(2\Pi(f-\Delta f^*t)^*t) + b_2 \sin(4\Pi(f-\Delta f^*t)^*t) + \quad (10)$$

Equations (6)-(8) can be re-written as follows:

$$G(t) = 0 \text{ when } \sin(2\Pi(f-\Delta f^*t)^*t) = 0 \quad (11)$$

$$2\Pi(f-\Delta f^*t)^*t = n^*2\Pi \quad (12)$$

$$(f-\Delta f^*t)^*t - n = 0 \quad (13)$$

$$\Delta f^*t^2 - f^*t + n = 0 \quad (14)$$

In FIG. 1, it can be seen that time=$T_1$ represents the first zero i.e. when n=1 and that time=$T_1+T_2$ represents the second zero i.e. when n=2.

Hence, these substitutions can be made into equation (14):

$$\Delta f^* T_1^2 - f^* T_1 + 1 = 0 \quad (15)$$

$$\Delta f^*(T_1+T_2)^2 - f^*(T_1+T_2) + 2 = 0 \quad (16)$$

In practice, with DSP we can accurately measure times T1 and T2. We can substitute these times into equations (15) and (16) and solve the two equations for the two unknowns f and Δf. In general, the solutions for f and Δf can be expressed as follows:

$$f = (T_2^2 + 2^* T_1^* T_2 - T_1^2)/(T_1^* T_2^*(T_1+T_2)) \quad (17)$$

$$\Delta f = (f^* T_1 - 1)/T_1^2 \quad (18)$$

The next step in determining the phase alignment error is finding the time/angle at which the local minimum of the BEMF occurs, in relationship to the Hall signal. Ideally this will occur at Π/6 radians or 60 degrees.

Although DSP can be used to track the BEMF and determine the time of the local minimum directly, in practice measurement of this time would be subject to error due to noise. An alternative approach, which is more immune to error, is to set an arbitrary threshold voltage for the BEMF waveform. The time/angle when the signal rises above this threshold is identified as time=$B_1$ and the time it falls below it is time=$B_2$. Noise errors can be further reduced by setting this threshold based on the output of a moving average. In this case the time=$B_1$ is set at the time of the last sample that forms the moving average that first equals or exceeds the threshold. The time=$B_2$ is set at the time of the first sample that forms the moving average that first equals or is less than the threshold.

Time $B_1$ represents the time since the first Hall signal edge and this time can be converted to an angle within the Hall signal:

$$2\Pi(f-\Delta f^*t)^*t = \theta(\text{radians}) \quad (19)$$

$$360(f-\Delta f^*t)^*t = \theta(\text{deg}) \quad (20)$$

$$360(f-\Delta f^* T_{B1})^* T_{B1} = \theta_{B1}(\text{deg}) \quad (21)$$

For Time $B_2$:

$$360(f-\Delta f^* T_{B2})^* T_{B2} = \theta_{B2}(\text{deg}) \quad (22)$$

An accurate estimate of the angle at which the local minimum occurred is simply the average of these two angles, i.e.

$$\theta_B = \theta_{B2+}\theta_{B1}/2 \quad (23)$$

The final Alignment error can now be calculated as

Align error=$(\theta_{B2+}\theta_{B1})/2 - 420$ deg

Figure 4:
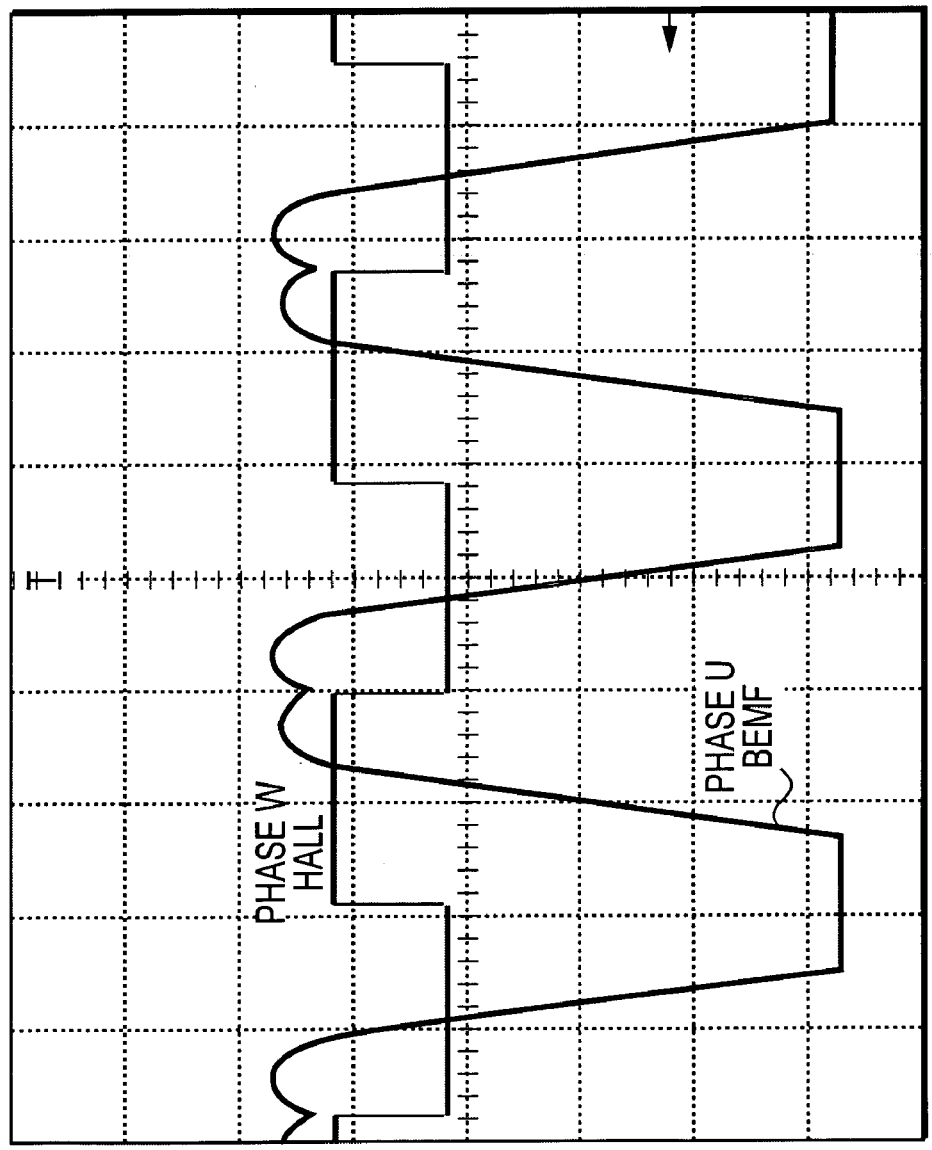
FIG. 4 is a graph showing a Phase W Hall signal and a Phase U BEMF signal.
Figure 5:
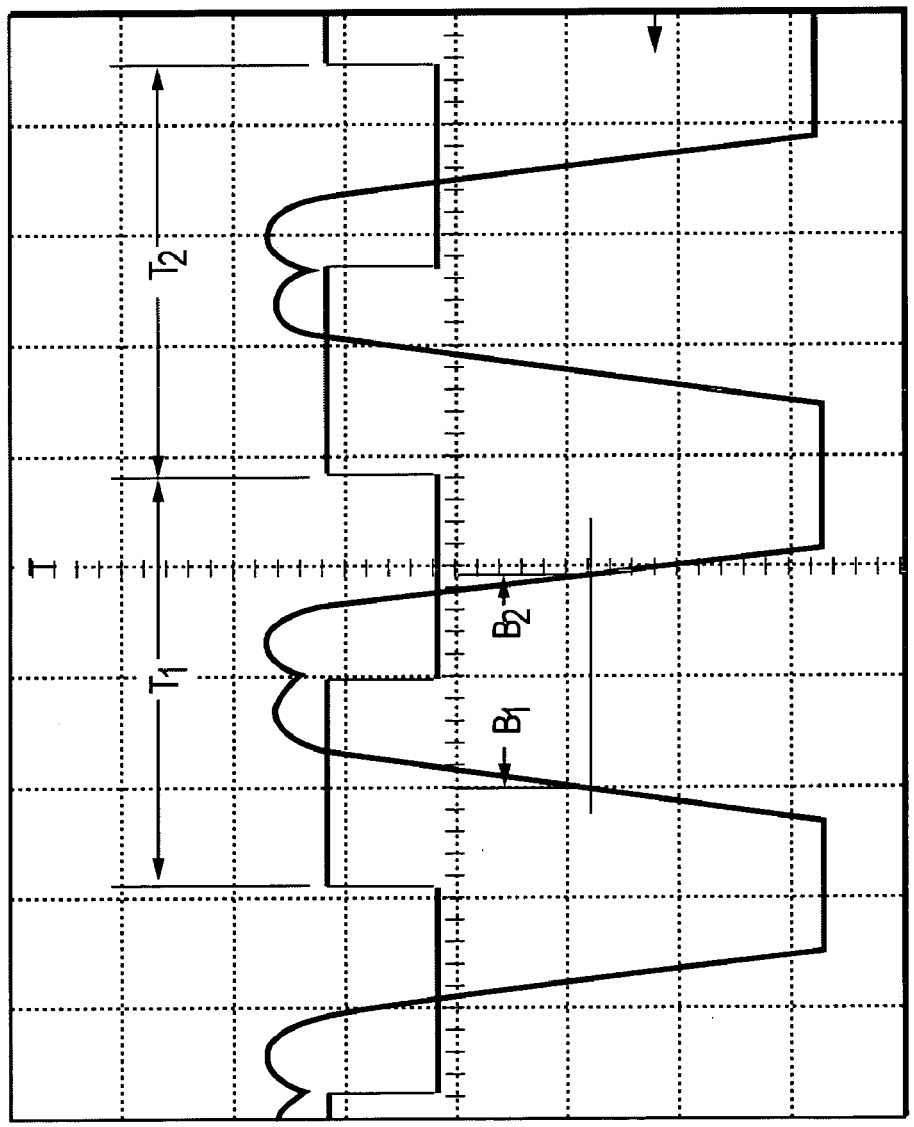
FIG. 5 illustrates a calculating method usable thereon.

Variations on the foregoing technique have been investigated and found to be useful. For example, the Phase U BEMF can be measured against the Phase W Hall signal as shown in FIG. 4. Ideally the falling edge of the Hall W signal should coincide with the local minimum in the Phase U BEMF. See FIG. 5. To calculate the Hall alignment factor, first, the time $T_1$, $B_1$, $B_2$ and H (see FIGS. 2 and 5) are found. Next ($B_2 - B_1$)/2 is calculated to determine B (FIG. 2). Finally, the Hall alignment factor in degrees is determined as $(B-H)^*360/T_1$.

In a third example, the Phase W BEMF is related to the Phase W Hall signal.

Figure 6:
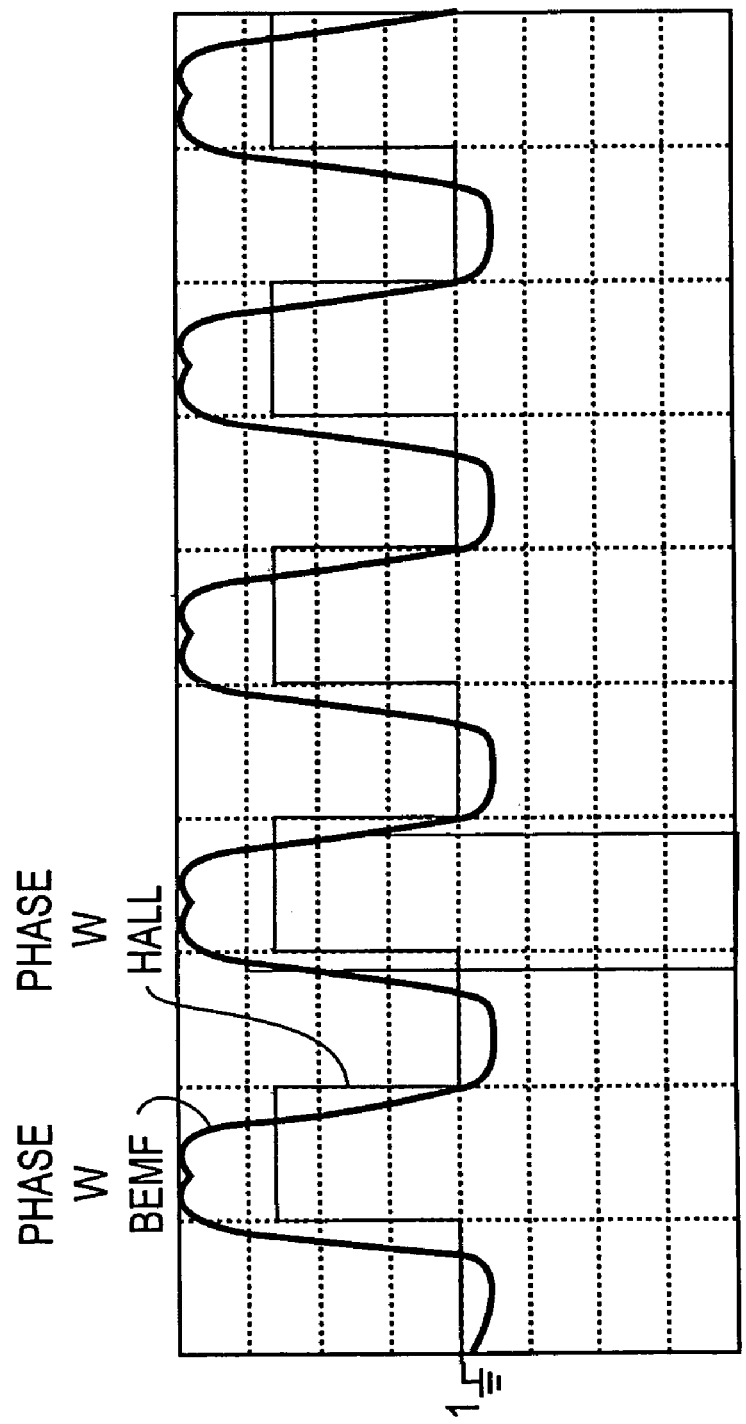
FIG. 6 is a graph showing a Phase W Hall signal and a Phase W BEMF signal.

Ideally the rising edge of the Hall W signal is exactly 60 degrees ahead of the local minimum in the BEMF waveform. See FIG. 6.

Figure 7:
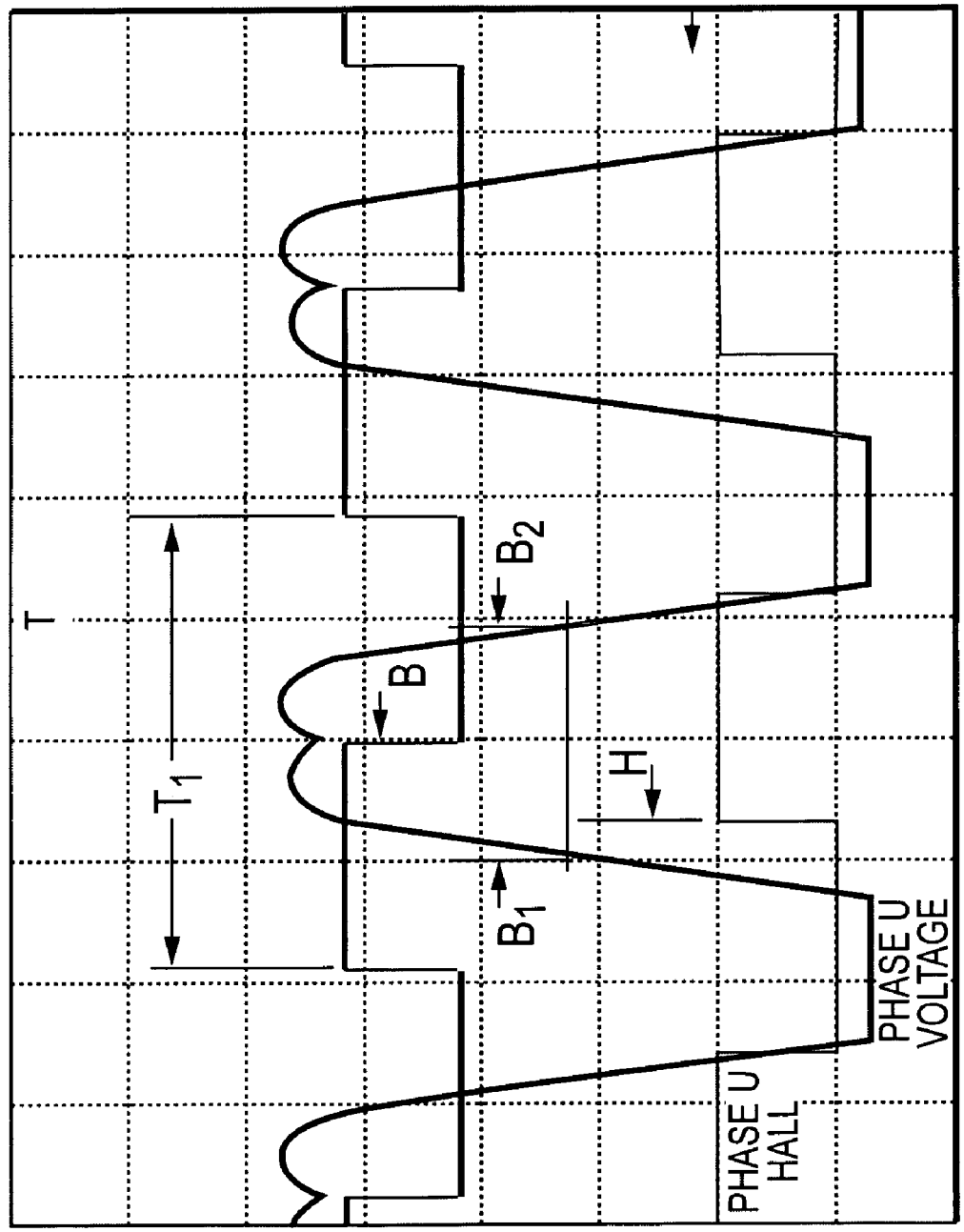
FIG. 7 illustrates a calculating method usable thereon.

To calculate the Hall alignment the following steps may be applied:

Step 1: Find times $T_1$, $B_1$, $B_2$, H (See FIG. 7)
Step 2: Calculate B=$(B_2-B_1)/2$
Step 3: Calculate the Hall alignment (deg)=$(B-(H-T_1/6))^*360/T_1$ Although the present invention has been described in relation to particular embodiments thereof, many other variations and modifications and other uses will become apparent to those skilled in the art. Therefore, the present invention is not limited by the specific disclosure herein.

The method and system are advantageous in that the Hall alignment procedure can be carried out with the power supply inverter still connected to the motor. Such an arrangement is especially advantageous in that it gives the back-EMF waveform the shape shown in the Figures, including the local minimum portion.

The motor control unit is usually built into the motor enclosure as seen at 14 in FIG. 1. The CANH and CANL (controller area network high/low) lines are connectable to the motor control unit and other components inside the motor and, in particular, may carry the Hall signals from the motor to the communication controller. The back-EMF signals are carried over the lines 18.

Although methods and systems are disclosed in which a phase difference is calculated between a Phase U Hall signal and a Phase U back-EMF signal, or between a Phase W Hall signal and a Phase W back-EMF signal, the scope of the invention extends broadly to any method or system wherein the calculating circuit calculates a phase difference between the Hall signal and the back-EMF signal of any given phase of the multiphase motor.

Although methods and systems are disclosed in which a phase difference is calculated between a Phase W Hall signal and a Phase U back-EMF signal, the scope of the invention extends broadly to any method or system wherein the calculating circuit calculates a phase difference between the Hall signal of any one phase and the back-EMF signal of any different phase of the multiphase motor.

What is claimed is:

1. A control system for a multiphase DC motor, comprising:
    a multiphase motor drive circuit;
    a circuit for outputting back-EMF signals from said motor drive circuit;
    a Hall effect sensors and a circuit for outputting Hall signals from said sensors, said Hall signals being indicative of rotor position; and
    a calculating circuit for calculating a phase difference between a Hall signal and a back-EMF signal and determining from said phase difference an amount of an alignment error of said Hall effect sensor in said DC motor.

2. The control system of claim 1, further comprising a memory circuit in said motor drive circuit which stores said phase difference and corrects said rotor position by correcting said output Hall signals according to said phase difference.

3. The control system of claim 1, comprising respective Hall signals and back-EMF signals for each phase of said motor; and
   wherein said calculating circuit calculates corresponding phase differences for each of said phases.

4. The control system of claim 3, further comprising a memory circuit in said motor drive circuit which stores said phase differences and corrects said rotor position by correcting said output Hall signals according to said phase differences.

5. The control system of claim 1, wherein said calculating circuit calculates a phase difference between a Phase U Hall signal and a Phase U back-EMF signal.

6. The control system of claim 1, wherein said calculating circuit calculates a phase difference between a Phase W Hall signal and a Phase U back-EMF signal.

7. The control system of claim 1, wherein said calculating circuit calculates a phase difference between a Phase W Hall signal and a Phase W back-EMF signal.

8. The control system of claim 1, wherein said calculating circuit calculates said phase difference between a rising or falling edge of said Hall signal and a local minimum of said back-EMF signal.

9. The control system of claim 8, wherein said calculating circuit calculates said local minimum of said back-EMF signal by interpolating between rising and falling edges of said back-EMF signal.

10. The control system of claim 9, wherein said calculating circuit interpolates between points at which said rising and falling edges of said back-EMF signal cross a predetermined threshold.

11. The control system of claim 1, wherein said calculating circuit calculates a phase difference between the Hall signal and the back-EMF signal of a single phase of said multiphase motor.

12. The control system of claim 1, wherein said calculating circuit calculates a phase difference between the Hall signal of one phase and the back-EMF signal of a different phase of said multiphase motor.

13. A control method for a multiphase DC motor, said motor having a multiphase motor drive circuit, a circuit for outputting back-EMF signals from said motor drive circuit, a Hall effect sensors and a circuit for outputting Hall signals from said sensor, said Hall signals being indicative of rotor position; said method comprising the step of calculating a phase difference between a Hall signal and a back-EMF signal and determining from said phase difference an amount of an alignment error of said Hall effect sensor in said DC motor.

14. The control method of claim 13, further comprising the step of storing said phase difference, and correcting said rotor position by correcting said output Hall signals according to said phase difference.

15. The control method of claim 13, wherein there are respective Hall signals and back-EMF signals for each phase of said motor; and
   wherein said calculating circuit calculates corresponding phase differences for each of said phases.

16. The control method of claim 15, further comprising the steps of storing said phase differences, and correcting said rotor position by correcting said output Hall signals according to said phase differences.

17. The control method of claim 13, wherein said calculating circuit calculates a phase difference between a Phase U Hall signal and a Phase U back-EMF signal.

18. The control method of claim 13, wherein said calculating circuit calculates a phase difference between a Phase W Hall signal and a Phase U back-EMF signal.

19. The control method of claim 13, wherein said calculating circuit calculates a phase difference between a Phase W Hall signal and a Phase W back-EMF signal.

20. The control method of claim 13, wherein said calculating circuit calculates said phase difference between a rising or falling edge of said Hall signal and a local minimum of said back-EMF signal.

21. The control method of claim 20, wherein said calculating circuit calculates said local minimum of said back-EMF signal by interpolating between rising and falling edges of said back-EMF signal.

22. The control method of claim 21, wherein said calculating circuit interpolates between points at which said rising and falling edges of said back-EMF signal cross a predetermined threshold.

23. The control method of claim 13, wherein said calculating circuit calculates a phase difference between the Hall signal and the back-EMF signal of a single phase of said multiphase motor.

24. The control method of claim 13, wherein said calculating circuit calculates a phase difference between the Hall signal of one phase and the back-EMF signal of a different phase of said multiphase motor.

* * * * *